United States Patent
Hoch et al.

(10) Patent No.: US 9,495,700 B2
(45) Date of Patent: *Nov. 15, 2016

(54) PORTFOLIO-LEVEL DECISION SUPPORT

(71) Applicant: Navera, Inc., San Francisco, CA (US)

(72) Inventors: Michael Hoch, San Francisco, CA (US); Colin Campbell, Berkeley, CA (US); Sandy Yu, Millbrae, CA (US); David Wallace, San Francisco, CA (US)

(73) Assignee: NAVERA, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,130

(22) Filed: Oct. 13, 2014

(65) Prior Publication Data

US 2015/0066686 A1     Mar. 5, 2015

Related U.S. Application Data

(63) Continuation of application No. 14/152,976, filed on Jan. 10, 2014, now abandoned, which is a continuation of application No. 13/268,096, filed on Oct. 7, 2011, now Pat. No. 8,635,135, which is a continuation of application No. 12/433,720, filed on Apr. 30, 2009, now Pat. No. 8,060,386, application No. 14/513,130, which is a continuation of application No. 14/152,986, filed on Jan. 10, 2014, now abandoned, which is a continuation of application No. 13/252,926, filed on Oct. 4, 2011, now Pat. No. 8,660,924, which is a continuation of application No. 12/433,720, filed on Apr. 30, 2009, now Pat. No. 8,060,386.

(51) Int. Cl.
*G06Q 40/00* (2012.01)
*G06Q 30/06* (2012.01)
*G06N 3/00* (2006.01)
*G06Q 30/02* (2012.01)
*G06Q 40/08* (2012.01)

(52) U.S. Cl.
CPC .......... *G06Q 30/0631* (2013.01); *G06N 3/006* (2013.01); *G06Q 30/0222* (2013.01); *G06Q 30/06* (2013.01); *G06Q 30/0601* (2013.01); *G06Q 30/0641* (2013.01); *G06Q 40/00* (2013.01); *G06Q 40/08* (2013.01)

(58) Field of Classification Search
CPC ............................. G06Q 40/00; G06Q 40/08
USPC ..................................................... 705/4, 35
See application file for complete search history.

(56) References Cited

U.S. PATENT DOCUMENTS

2002/0077951 A1 * 6/2002 Gilbert et al. .................. 705/36
2003/0120511 A1 * 6/2003 Legnini ............................ 705/2

(Continued)

*Primary Examiner* — Lalita M Hamilton
(74) *Attorney, Agent, or Firm* — Michael K. Bosworth; IPxLaw Group LLP

(57) ABSTRACT

The present invention employs branded virtual characters to engage and educate users regarding an array of health-related insurance, financial, and other benefits, enabling informed decision-making during this complex process. Information is collected gradually on an "as-needed" basis to avoid overwhelming users with lengthy and redundant requests for information, while still providing a safe environment for users to freely discuss personal, health, financial and related sensitive issues. Throughout the process, the system employs a portfolio-driven approach to identify inter-dependencies among different benefit products and plans, and prioritize and recommend "portfolio-level" benefit solutions. Back-end components enable users to complete transactions (e.g., via third-party quoting and enrollment systems and employer HRIS systems, as well as via access to external medical and claims data), and provide third parties with access to the educational, decision-making and transactional aspects of this process, including various authoring and other tools to generate and modify system content over time.

10 Claims, 7 Drawing Sheets

(56) References Cited

U.S. PATENT DOCUMENTS

| | | | |
|---|---|---|---|
| 2005/0234742 A1* | 10/2005 | Hodgdon | 705/2 |
| 2007/0168302 A1* | 7/2007 | Giovinazzo | G06Q 40/06 705/36 R |
| 2008/0082351 A1* | 4/2008 | Kelley-Hrabe | G06Q 50/22 705/2 |
| 2008/0306763 A1* | 12/2008 | James | G06F 19/3418 705/2 |
| 2010/0063930 A1* | 3/2010 | Kenedy et al. | 705/51 |
| 2011/0145166 A1* | 6/2011 | Kmak et al. | 705/36 R |
| 2014/0114674 A1* | 4/2014 | Krughoff | G06Q 30/0629 705/2 |
| 2014/0180714 A1* | 6/2014 | Mun | G06Q 40/08 705/2 |

\* cited by examiner

PORTFOLIO-LEVEL DECISION SUPPORT

BACKGROUND

Field of Art

The present invention relates generally to the field of complex online transactions, and in particular to an integrated portfolio-driven decision-support and transactional system that facilitates each user's creation and management of a cohesive benefits portfolio.

Description of Related Art

With the advent of the Affordable Care Act, the attention focused on healthcare, and in particular on the selection of medical plans, has increased exponentially. "Plan Chooser" websites have become commonplace, enabling individuals and families, including employees, to select the most "suitable" medical plan based on various characteristics, including financial costs (e.g., premiums, deductibles and out-of-pocket maximums) as well as predicted usage of medical resources (e.g., prescription drugs, doctor visits, surgeries and other procedures).

But the selection of a medical plan, though significant, is but one of the many choices faced by individuals and families regarding available health, insurance, financial and related benefits. For example, even after selecting a medical plan, to what extent, if any, should a family also select an "accident" or "short-term disability" plan? What about life insurance, 401K plans and the like?

Today these decisions are made on an individual basis, as if all of these benefits were unrelated to one another. But, the problem is that these various benefits are often interrelated. For example, even the most desirable medical plan may leave a "medical gap" (e.g., due to a relatively high deductible) that could be filled by an appropriately sized "accident" policy. Moreover, a family's level of income might leave an "income gap" that could be filled by a "short-term disability" policy, depending upon various demographic and other factors. And families have a finite number of "premium dollars" that are available for the acquisition of these benefits, depending of course upon their level of risk aversion.

While existing decision-making systems facilitate the selection of different policy offerings within an individual "product" or benefit type (e.g., short-term disability), such systems fail to account for these "gaps" in coverage resulting from the inter-dependencies among different products and individual benefit plans, particularly as applied on a personalized basis to a particular user's family. What is needed is a system that takes a "portfolio view" of the benefits landscape in an effort to facilitate the decision-making process while taking into account these various inter-dependencies.

SUMMARY

The present invention encompasses an architecture in which employees and other individuals, and their families, are educated about an array of health-related insurance, financial, and related benefits, including the various factors necessary to facilitate this complex decision-making process. The system also has access to third parties (e.g., employers, benefit providers and third-party data providers) and their automated systems to assist in the educational, decision-making and transactional aspects of this process.

The system employs branded virtual characters to engage users in a friendly conversational manner that not only facilitates the gradual collection of data on an "as-needed" basis (to avoid overwhelming users with lengthy and redundant requests for information), but also provides a safe environment for users to freely discuss personal, health, financial and related sensitive issues. These virtual characters become "trusted advisors" as well as similarly situated "virtual family members" to whom users can relate, which is particularly valuable when dealing with emotional issues such as accidents, disability and even death.

The system also employs various analytical tools, in addition to relying upon individual, collaborative and industry data, to educate users regarding the vast array of relevant concepts necessary for them to make informed decisions regarding available benefits. Throughout the entire process, it employs a portfolio-driven approach to assess inter-dependencies (including medical, income and other gaps in coverage) among different benefit products and alternative plans, identify those inter-dependencies for users, and prioritize and recommend "portfolio-level" benefit solutions across a vast array of health-related, insurance, financial and other products.

Various back-end components enable users to complete transactions (e.g., via third-party quoting and enrollment systems and employer HRIS systems, as well as external medical and claims data), and provide third parties (e.g., benefit providers, employers, etc.) with various authoring and other tools to generate and modify system content over time.

DETAILED DESCRIPTION

Figure 1:
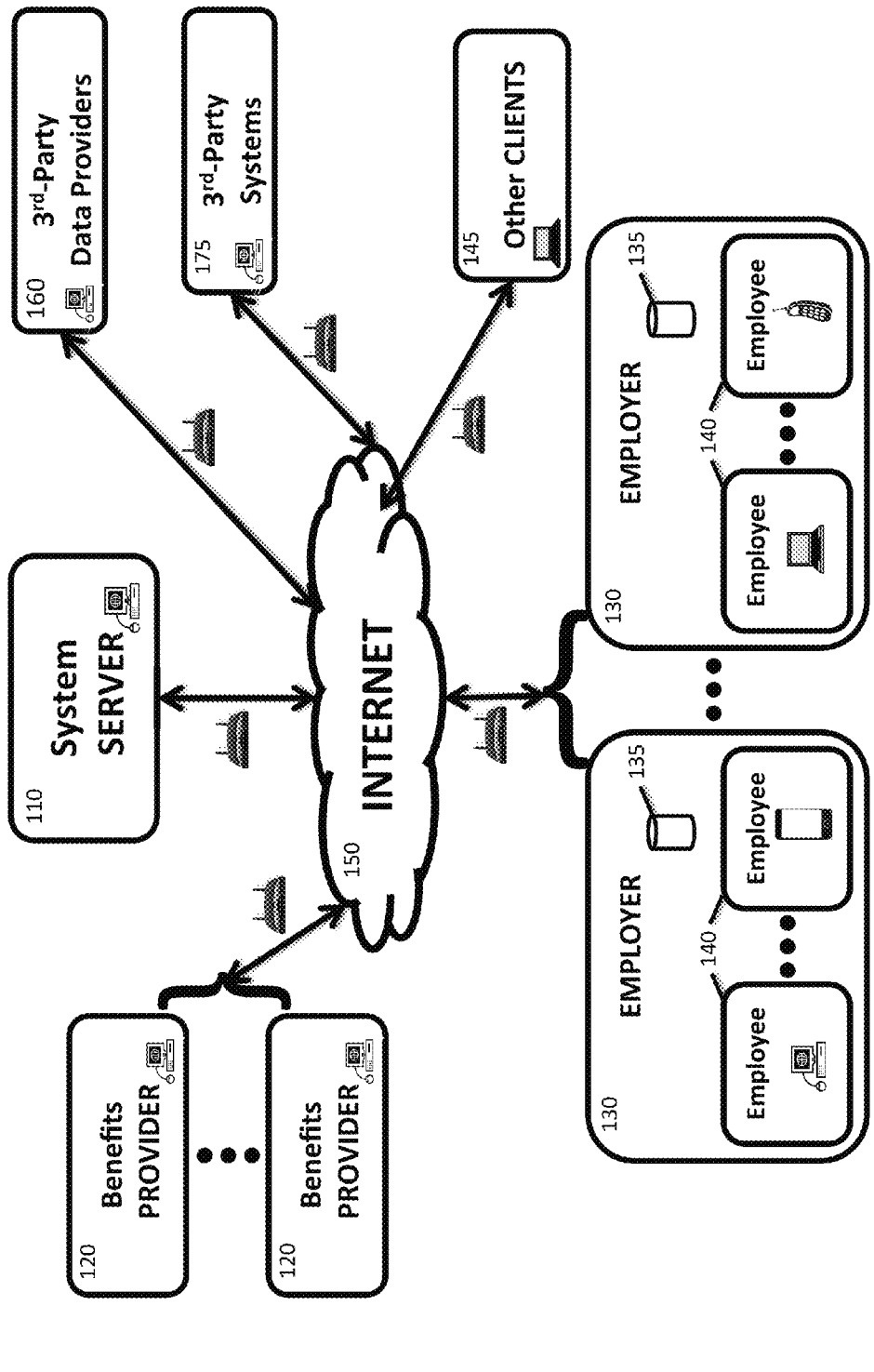
FIG. 1 is a block diagram illustrating an architectural system overview of one embodiment of the present invention.

One embodiment of a system of the present invention is illustrated in FIG. 1. System 100 illustrates a network (Internet 150) by which the devices of various key players are interconnected (e.g., via edge routers 115). System Server 110 includes much of the key functionality of the present invention that will be described in greater detail below. It should be noted that the functionality of system 100, including that of System Server 110, may in other embodiments be allocated among different physical and conceptual components and distributed among one or more server computers (desktops, laptops and even smartphones), databases and other storage devices, as well as system and application software modules.

In the embodiment illustrated in FIG. 1, the end users of system 100 are Employees 140 whose Employer 130 could be a private or public company, government entity or other organization. Also illustrated is database 135 (e.g., part of a company's "Human Resources Information System" or HRIS), in which employee profile information, personnel employment records and other related data are stored. In this embodiment, Employees 140 access System Server 110 over the Internet 150 via computers (desktops, laptops, smartphones, etc.) at the site of their Employer 140, as well as remotely (e.g., from home or other locations) via their own personal devices. In other embodiments, system 100 serves (in lieu of or in addition to Employers 130) individual end users or other Clients 145, independent of their employer.

In addition to an HRIS database 135 at an Employer 130 site, System Server 110 relies upon various other key third-party systems, including those of various Benefit Providers 120, $3^{rd}$-Party Data Providers 160 and other $3^{rd}$-Party Systems 175. For example, Benefit Providers 120 include providers of medical insurance, life insurance and other health-related products, as well as financial products such as 401K plans. System Server 110 can access information from these Benefit Providers 120 on a real-time, periodic, on-demand or other basis, depending upon the desired frequency and other factors imposed by a given scenario. Such information may include the details of a specific medical plan, for example, which might change over time, as well as prior individual policy data for an individual or employee, or employer-specific plan details, among other data.

$3^{rd}$-Party Data Providers 160 afford access to a wide variety of industry data (e.g., statistical data regarding claims, accidents, injuries and illnesses), as well as individual, aggregate and collaborative data that informs the educational and decision-making aspects of system 100. Other $3^{rd}$-Party Systems 175 include, for example, integrated underwriting and enrollment systems that enable users of system 100 to complete transactions and enroll in a selected plan while leveraging user profile and related information and thus facilitating "one-stop shopping" for an entire benefit portfolio.

Figure 2:
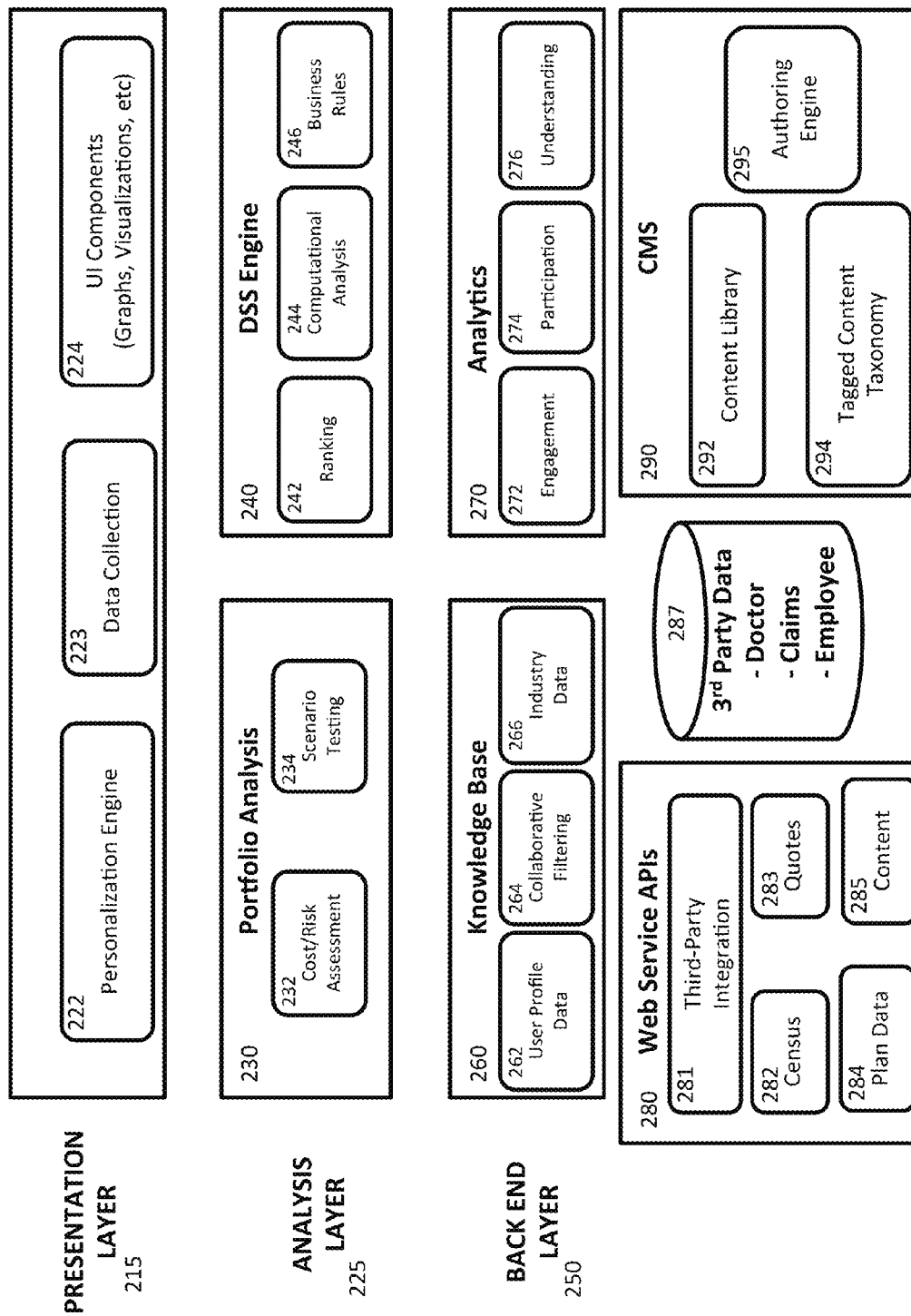
FIG. 2 is a block diagram illustrating one embodiment of key server components of the present invention.

FIG. 2 illustrates one embodiment of the key functional components of System Server 210. As a conceptual matter, these components are categorized into 3 layers: a "User Experience" (UX) Presentation Layer 215, which manages data collection and personalized interactions with users (including graphs and other visualizations), an Analysis Layer 225 which includes a decision support engine and portfolio-level as well as individual plan-level analyses, and a Back End Layer 250 which includes content authoring tools and APIs and databases for accessing and exchanging data with third-party systems.

Presentation Layer 215 is primarily responsible for facilitating a personalized approach to user interaction that extracts relevant data from users on an "as-needed" basis. Personalization Engine 222 continually presents users with personalized recommendations, based upon their interactions with the system, including information collected over time relating to their profile and demographic info, as well as industry data and collaborative filtering of data from third parties and other users. At each stage of the process, Personalization Engine 222 employs this data to generate personalized recommendations (e.g., of a particular medical plan based on a user's income, demographics, answers to targeted questions, etc.), personalized educational material (e.g., focused on a particular factor such as a disabling accident relating to a user's field of employment) and relevant questions designed to elicit information that facilitates distinctions among individual plan choices.

Initial information is collected via Data Collection module 223, including basic login/authentication credentials and other identifying information. As the educational process unfolds, and initial recommendations are presented (e.g., starting with medical product selection), users are afforded opportunities to ask questions and explore a variety of different educational vignettes. These vignettes include an assortment of UI Components 224 (e.g., bullet points, graphs and other visualizations) that employ various forms of media, such as text, graphics, animation and video, presented in an interactive manner that becomes more personalized as the process continues.

For example, animated virtual characters are employed in a manner designed to engender trust when dealing with personal, health, financial and related sensitive issues. In addition to a "trusted advisor," other virtual characters include family members with which users can relate. In one embodiment, the virtual characters include a spouse and kids of similar ages, ethnicities and economic backgrounds to the user.

When data is required at a particular stage in the process, the user is prompted for such data "on demand," thereby avoiding not only the need to ask for the same data multiple times, but also inundating the user with requests for information that is not yet (and may never be) relevant. Users are in control of the process, and can pause and restart at any time, as well as jump to other sections of interest and return when desired.

Moreover, a user's status or progress in this entire benefit selection process is accessible at any time. In one embodiment, described in greater detail below, a "dashboard" illustrates a user's current level of progress in 3 key product categories (Health, Wealth and Life), as well as the user's currently recommended and/or selected plans for each available product within these 3 categories. For example, a user may have selected 2 of 4 recommended Health products (e.g., a recommended HMO medical plan and a particular dental plan), while declining 2 others (e.g., accident and vision products). That user may have selected 1 of 2 recommended Wealth products (e.g., disability), but not yet explored the other (e.g., 401K plan), while declining any of the recommended Life products (e.g., term life insurance).

As will be discussed below, this "dashboard" enables users to visualize a benefit "portfolio view" which not only informs them of their current level of progress in reviewing products and selecting desired plans within each product, but also illustrates "gaps" in their coverage that might be filled by revisiting certain products and considering modifications to their selections. Just as a spreadsheet enables a "what if" analysis that permits users to visualize the consequences of revised selections, so too does this dashboard and other UI Components 224 enable users to visualize at any point in the process not only the status of their progress but also the consequences of their current (and modified) product plan selections.

This portfolio view is enabled by Portfolio Analysis module 230 in Analysis Layer 225 (to be discussed in greater detail with respect to FIG. 3 below), which relies upon DSS Engine 240 for decision support calculations, prioritization of products, and overall matching of available products and plans to each user's particular situation. Portfolio Analysis module 230 continually performs Cost/Risk Assessments 232 as more information is acquired—e.g., as users change their plan selections and answer questions relating to plan factors, or as additional information is gathered regarding user profiles and interactions with system 100, products and plans, industry data, collaborative data and various other cost and risk assessment factors.

Portfolio Analysis module 230 relies upon Scenario Testing module 234 to model different user portfolio scenarios, e.g., different combinations of products and particular plans, in an effort to prioritize products and generate recommended plans on a personalized basis for each user. DSS Engine 240 facilitates the analysis of each potential scenario, ultimately ranking available products and/or plans via Ranking module 242. Ranking module 242 in turn relies upon Computational Analysis module 244 to perform calculations on individual plans as well as entire user portfolios. The formulas utilized in these calculations are functions of a wide variety of parameters, including plan details as well as user and industry data.

Moreover, these calculations are performed by Computational Analysis module 244 in accordance with an array of Business Rules 246, which are themselves generated from individual and collaborative user data and industry data, as well as plan details of the products available to particular users. For example, one rule might recommend a particular product or plan only for persons within a defined age group, while another might condition its recommendation on a combination of demographic factors (e.g., profession, age, geographic area, etc.) determined by prior industry studies. This process will be discussed in greater detail below with respect to FIGS. 3-6.

Underlying the "portfolio-view" analyses performed by Analysis Layer 225 are a collection of Back-End Layer components 250, which in one embodiment include databases (and related retrieval systems), analytics modules, authoring modules and APIs to provide access to third-party systems and data.

Knowledge Base 260 includes User Profile Data module 262, which stores each user's profile and demographic data, as well as data extracted from users during interactions with system 100. Such information includes not only factual information (e.g., number of children, income, medical history, etc.), but also behavioral information elicited in part from answers to questions (e.g., relating to risk aversion, hobbies, nutrition, preventative measures, etc.).

Knowledge Base 260 also includes Collaborative Filtering module 264, which utilizes user data not only from User Profile Data module 262, but from third-party sources as well, to generate aggregate demographic and behavioral profiles that are employed by system 100 in various different ways. For example, such aggregate data can be used over time to affect many other aspects of system 100, such as identifying new questions for users, modifying Business Rules 246, and even updating particular formulas and calculations used to compare individual products and modules.

Finally, Knowledge Base 260 includes Industry Data 266, which reflects data compiled from various third-party sources used by Analysis Layer 225 and other parts of system 100. In one embodiment, for example, cost averages and ranges of household incomes, plan premiums and other details, pregnancies and doctor and specialist visits, as well as common surgeries and other medical procedures, are compiled from various sources and utilized both to educate users and to perform product and plan comparisons. Various geographic and other demographic filters are employed to utilize this data in a more personalized manner.

Industry Data 266 is also used, in one embodiment (alone and/or in combination with other data), to affect recommendations and other decision-support outcomes made by Analysis Layer 225. For example, such data might be utilized to determine whether a user is "underinsured" (e.g., if they spend more than 10% of their annual household income on out-of-pocket medical expenses). Such a determination might lead system 100 to recommend that a user modify a prior medical plan selection, or perhaps, depending upon the nature of the out-of-pocket medical expenses, fill a "medical gap" with a different product, such as an "Accident" policy.

As is apparent, the modules of Knowledge Base 260 play a central role in educating users and informing recommendations made as a result of portfolio-level analyses by Analysis Layer 225. Much of the information stored in Knowledge Base 260 is extracted via access to $3^{rd}$-Party Data 287, such as claims data, employee data from employer HRIS and other systems, medical records from doctors, hospitals and other offices, and a wide variety of industry and user-specific data. It should also be noted that, in another embodiment, 3rd-Party Data 287 is updated with information generated from system 100.

In one embodiment, access to these third-party databases and systems is facilitated by various Web Service APIs 280. These APIs enable system 100 to access and integrate with third-party systems, via Third-Party Integration APIs 281, as well as obtain third-party data (e.g., Census data 282 and Quotes 283) and maintain up-to-date Plan Data 284 for the various products and plans that may be available to particular users at any given time. Web Service APIs 280 (including various others not shown in this embodiment) permit real-time, periodic, on-demand and other forms of 2-way access to these $3^{rd}$-party systems and databases. In addition, they permit access to Content 285, utilized throughout system 100, that third parties create and modify via Content Management System (CMS) 290, described in greater detail below.

For example, a Web Service API 280 call might yield information, targeted to a particular user (e.g., based on their employer, as well as their geographic location, age or other demographic data), that a particular set of medical products is available. Availability of a particular plan might also depend upon information not yet extracted from the user. In one embodiment, an API call returns a form, which system 100 parses to determine that additional information is required from the user, and then obtains such information by posing the relevant question to the user. System 100 then returns the "filled-out-form" to the $3^{rd}$-party service in order to obtain a final determination as to whether the particular plan is available to the user. This entire process is effectively transparent to the user, except for the relevant question for missing information that is asked only "on demand" when it is needed.

Similarly, Quotes 283 can be obtained from third-party quoting systems via a Web Service API 280 on an as-needed basis. For example, upon determining that 3 different Accident plans are available for a particular user, the user's relevant profile information can be sent to the quoting system to obtain real-time quotes that system 100 displays to the user in the form of prioritized recommendations (after comparing and ranking such quotes via DSS Engine 240, in conjunction with an overall Portfolio Analysis 230 that takes into account the user's current benefits portfolio, overall financial situation and other relevant factors.

In one embodiment, upon completing the selection of a plan (e.g., one of the 3 available Accident plans), the user is automatically enrolled in that selected plan via Third-Party Integration APIs 281, which integrate system 100 with a third-party enrollment system. In some embodiments, the user is seamlessly connected to a third-party enrollment system without system 100 remaining "in the loop" until the enrollment process completes, while in other embodiments system 100 remains in the middle of indirect communications between the user and the third-party enrollment system.

In either case, system 100 passes relevant user data to the third-party enrollment system (via Third-Party Integration APIs 281) to facilitate the enrollment process and avoid the need for users to provide duplicate information already known to system 100. Moreover, in the event additional information is required from the user, Third-Party Integration APIs 281 are employed to inform system 100 that it must prompt the user for this additional information and then provide such information to the third-party enrollment system to complete the enrollment process.

Back-End Layer 250 also includes Content Management System (CMS) 290 to enable third-party (as well as system 100) authors to develop and modify personalized content. Personalized content can be created and customized by a wide array of third parties (e.g., via Web Services API 280), including small and large employers, insurance companies, banks and various health, financial and other benefit providers (and even ancillary providers of third-party data and services).

For example, an employer might desire to "brand" or even customize virtual characters to better reflect its values and those of its employees. Similarly, an insurance company that provides particular health benefits might also want the virtual characters to reinforce its brand and values. Third-party providers might also desire to customize not only the factual details relating, for example, to a medical insurance plan, but also the manner in which users are educated about their products (e.g., using particular text, graphics, animations or videos, or even the manner in which users interact with content relating to their plans).

Individual "atomic" content elements can be developed by authorized third parties and added to Content Library 292. Tagged Content Taxonomy module 294 enables these content elements to be tagged, for example, for use in connection with a particular third-party provider (e.g., the medical plans offered by a particular insurance company or made available through a particular employer), or even in connection with particular users (e.g., based on their profile or other demographic factors).

Authoring Engine 295 provides the mechanism by which system 100 and third-party authorized "authors" can generate content from content elements in Content Library 292. For example, authors can build vignettes and other educational modules from these content elements, and can modify and customize text, audio dialogue, animations and video elements for branding, personalization and other purposes.

Analytics module 270 provides a mechanism for system 100 to monitor user interactions as well as user behavior in order to enhance the overall effectiveness of the process, and thereby increase the value proposition to users and providers (carriers, brokers, employers, etc.) alike. For example, an increase in user engagement and participation with respect to ancillary and supplemental products will result in a corresponding increase in cumulative premium payments to providers, which will enable them to improve their allocation of risk among a wider user base. Moreover, such an increase in user engagement and participation will gradually lower the cost of customer acquisition and retention, while enabling providers to differentiate themselves. Users also benefit through improved personalized education regarding available benefit products, which enables them to make informed decisions regarding which combinations of particular plans provide them with the most effective overall benefits portfolio.

The types of user interaction and behavior that are monitored and analyzed by Analytics module 270 can, in one embodiment, be conceptually divided into three categories. Engagement module 272 monitors a variety of factors over time (e.g., cumulatively, per month or year, per session, etc.), such as the number of users who visited the site (page views, etc.) and/or a particular module, page or other section of system 100. In addition, the average time users spend on the site, or on a particular product or module, is also monitored, along with the number of times it is accessed, percentage completed over time and by number of sessions, and even filters such as time of day, peak periods, etc. The particular device utilized by each user (e.g., employee work computer, remote smartphone, PC or other device, etc.), as well as each user's overall satisfaction (e.g., answering targeted questions regarding the overall experience of the system or of a particular module) is also tracked. The possibilities are endless.

Such raw information is utilized by Analytics module 270 in a variety of different ways. For example, brokers might use this raw engagement data to cross-sell other voluntary products, and receive feedback regarding the extent to which users explored and/or ultimately purchased such products (including average coverage levels, etc.). Employers can utilize this "buyer preference" data to track the effectiveness of different product offerings (and even modifications to content) on employees' satisfaction with the process, decision-making efficiency, and possibly even retention rates. Targeted employee satisfaction and related surveys can also reveal the extent to which employees understand and benefit from the various product offerings and the manner in which they are explained.

Similarly, Participation module 274 monitors much of this same data, but from the perspective of actions such as enrolling in a particular plan, purchasing a product, selecting a particular coverage level, etc. The extent to which users follow recommendations (e.g., enroll in a recommended plan) is also monitored. Brokers can track such information per product, and on a commission basis, which enables them to perform "A-B" comparisons as they alter their product offerings (and/or modify content, e.g., to better educate users regarding particular products or plans) in an effort to be more effective in selling and cross-selling particular products or plans.

Finally, Understanding module 276 focuses on user satisfaction and understanding of particular products, modules, concepts and other aspects of the engagement, education and transactional stages of the overall process. In one embodiment, targeted surveys are distributed throughout the process in order to avoid overwhelming users with too many questions, particularly at a time when users are no longer invested in the outcome (e.g., after enrollment). For example, a user might be asked a question immediately following an educational presentation on a particular concept, such as long-term disability, to measure the effectiveness of the presentation on the user's understanding of the concept. Here too, the effectiveness of content changes made by providers (e.g., changes in module length, use of particular questions or graphics, etc.) can be measured based upon their effects on users (e.g., answering survey questions correctly, enrollment rates, navigating away from particular content, etc.).

In addition to these raw analytics, Analytics module 270 also generates higher-level analytics. For example, Engagement Module 272 also monitors users' paths through various sections and modules in order to answer more complex higher-level questions, such as the following:

"Where are they going?"

"Where do they spend their time?"

"Which modules were not used?"

"Which modules engaged users, but did not result in a decision?"

"Which users were recommended Plan X, but enrolled in Plan Y?"

"Which users enrolled without using any "plan choosers" or other decision support?"

In other embodiments, even more granular information is monitored and captured, such as filtering behavior by age and gender and dependents (e.g., if 40-50 year-old parents have dependents, did they sign up for benefits that included those dependents?). Also, how many segments did users encounter before enrolling? How many enrollees used the calculators? Are users more likely to enroll if they spend more time on the system, or encounter particular modules or vignettes? Once again, the list of useful data, and inferred answers to higher-level questions, is endless.

Similarly, Participation module 274 monitors, in one embodiment, the average time spent by users on supplemental products, as well as the ratio of enrollments to declined products and the demographics of enrollees (e.g., nurses in their 40s tend to enroll in particular products or plans). And Understanding module 276 monitors who viewed and understood (based on targeted survey questions) the ACA module. These higher-level analytics enable providers (including employers) to reduce calls and other support obligations, and increase employee satisfaction and retention.

In one embodiment, Analytics modules 270 also generate reports including the raw and higher-level analytics data, which are delivered to various third parties (benefit providers, brokers, employers, etc.) who utilize these analytics to modify product offerings and plan details as well as to author and modify content which in turn will affect the analytics generated as a result of these modifications.

Figure 3:
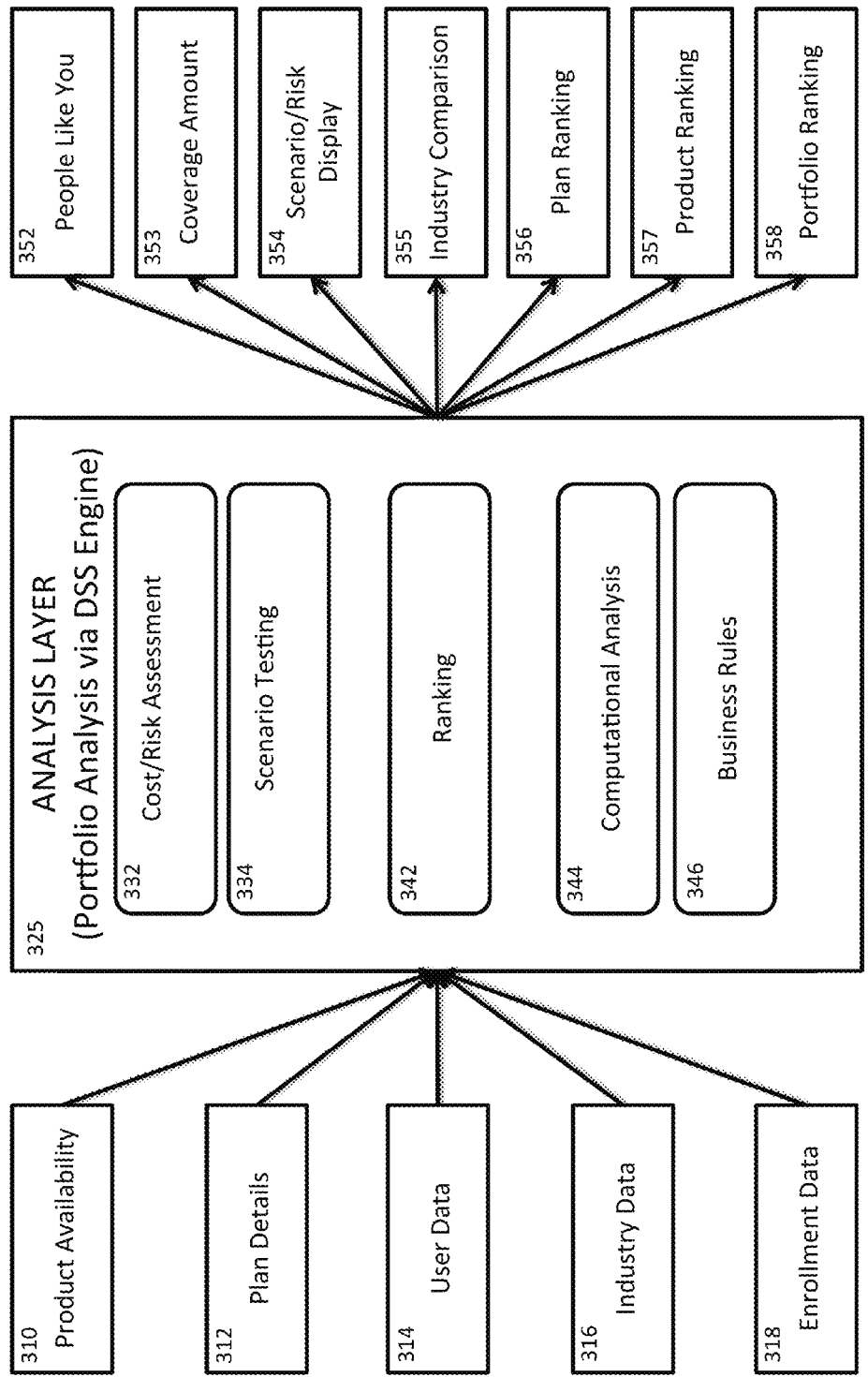
FIG. 3 is a block diagram illustrating a "black box" representation of one embodiment of a decision-support system component at the portfolio analysis layer of the present invention.

While FIG. 2 identifies the key modules of System Server 210, FIG. 3 illustrates the decision support and portfolio analysis aspects of Analysis Layer 325 (225 in FIG. 2) in greater detail. Looking at Analysis Layer 325 as a "black box" facilitates an understanding of its role in transforming its various input data into prioritized specific recommendation outputs.

Inputs to Analysis Layer 325 include, in one embodiment, Product Availability data 310 (e.g., Medical, Dental, Vision, Life, STD, Critical Illness, Accident, etc.), which depends upon the products and specific plans offered by various providers to particular employers, and may even be available only to employees or other users meeting certain criteria (e.g., depending upon a spouse's coverage or other factors). Plan Details 310 (e.g., premium, deductibles, max out-of-pocket coverage, etc.) will also be similarly personalized to an appropriate level of granularity.

User Data 314 (e.g., age, marital status, health status, dependents, income, doctor choice, claims, etc.) is also made available as an input to Analysis Layer 325, as such personalized data will greatly affect the analysis and comparison of available products and plans. Similarly, Industry Data 316 (e.g., doctor costs and other statistics regarding premiums, deductibles, out-of-pocket maximums, etc.) will also play a role in facilitating these comparisons, such as estimating actual costs (e.g., based on average doctor fees, as well as expected number of visits and likely types of procedures). Note that precise future costs cannot always be determined with certainty, and therefore must be based on educated estimates using available data. Enrollment Data 318 (e.g., products in which users are or have been enrolled over prior years) also serves as an input to Analysis Layer 325, and will have an effect on various calculations and comparisons.

The output side of this Analysis Layer 325 black box includes "People Like You" data 352, which provides users with information regarding similarly situated individuals, so they can feel comfortable knowing what others have chosen as well as their resulting outcomes. This information serves an educational purpose, and provides additional weight to system 100 recommendations.

More specific outputs include Coverage Amounts 353, which include recommended plan coverages (e.g., $10K v $5K accident plan), Scenario/Risk Displays 354, which illustrate pros and cons of alternative scenarios and Industry Comparisons 355, which illustrate, for example, how these scenarios differ across different industries, including a user's current profession. All of these outputs also serve an educational purpose designed to provide additional information to facilitate user decisions.

Perhaps the most directly relevant Analysis Layer 325 outputs include Plan Ranking 356, Product Ranking 357 and Portfolio Ranking 358 results. The specific calculations employed in determining these rankings will be described in greater detail below. What they share in common, however, is a "portfolio view" that takes into account various inter-dependencies that affect what would otherwise be a simple "plan chooser" comparison among available individual plans.

For example, Plan Ranking 356 results differ from those of a typical "plan chooser" comparison in that they include consideration of these various inter-dependencies, such as a "medical gap" caused by selection of a particular medical plan. In that scenario, Cost/Risk Assessment module 332 identifies that medical gap dependency based upon an analysis of various input data, including (in one embodiment) the user's medical Plan Details 310 (e.g., premium, deductible, out-of-pocket maximum, etc.) and various User Data 314 (e.g., annual income, prior medical plan usage, etc.).

In that embodiment, Scenario Testing module 334 relies upon DSS Engine modules 240 to test and rank various "portfolio" scenarios in accordance with existing Business Rules 346. For example, Computational Analysis module 344 relies upon Ranking module 342 to test and rank individual plans among various products, ultimately determining that an Accident product will best fill the medical gap. These scenarios include rankings of different individual plans among different products, which in turn result in different Product Ranking 357 (e.g., recommending that a user consider an Accident product immediately following selection of a particular medical plan). Each of these scenarios ultimately results in a different Portfolio Ranking 358 output (e.g., after a user selects a particular Accident plan).

Throughout this process (described in FIG. 4 below), various Business Rules 346 affect these calculations and the weighting of various formula parameters. For example, in one embodiment, the sum of a selected medical plan's deductible plus out-of-pocket maximum is categorized as providing "medium exposure" between the range of $2000 and $5000, which is a factor in the recommendation of an Accident product. Yet, for users more than 50 years of age, an Accident plan may not be recommended.

For younger users (e.g., under age 30), who are more likely to get into accidents, short-term disability (STD) and long-term disability (LTD) products may be recommended over Accident products in order to protect their paychecks. But an "active" user (e.g., based on answers to targeted questions and/or past medical history) may be more prone to accidents, and therefore a more likely candidate for an Accident policy. A user's income, health status and prior medical history are all factors that will, to some extent, influence Product Rankings 357 and Plan Rankings 356. As will become apparent, numerous other factors and different formulas and parameter weightings may be employed without departing from the spirit of this invention.

Figure 4:
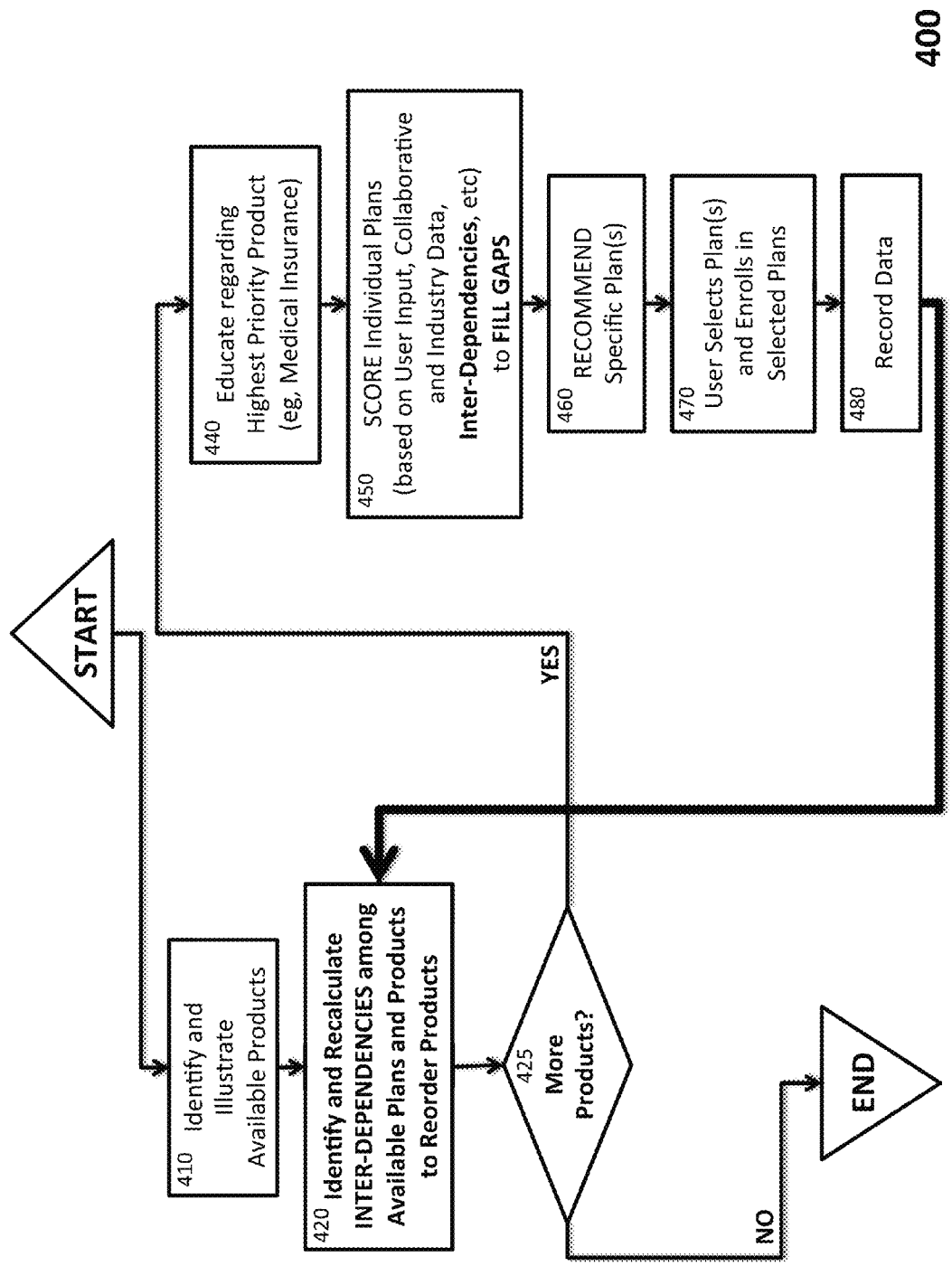
FIG. 4 is a flowchart illustrating one embodiment of a portfolio-level analysis process performed by a decision-support system component of the present invention.

One embodiment of this portfolio-level analysis process 400 is illustrated in FIG. 4. In step 410, the system identifies available products and associated plans, e.g., via Plan Data APIs 284. In other embodiments, details of available products and plans are pre-stored by the system before process 400 is initiated.

In step 420, the system recalculates the various inter-dependencies among the available products and plans, ultimately re-prioritizing products to determine the highest priority product for users to explore. In one embodiment, medical products are initially deemed the highest priority, as the selection of even the most desirable medical plan may result in various inter-dependencies among products and plans, such as "medical gaps." In other embodiments, step 420 performs this recalculation step even before a user has selected any benefit plan.

As discussed above, step 420 involves the testing of various scenarios by Portfolio Analysis 230 and DSS Engine 240 modules. In one embodiment, these scenarios consider plan details among all available products and plans (including the lack of availability of a particular product and/or plan), as well as individual and collaborative user data and industry data. Ultimately, the result of step 420 is the identification of various personalized inter-dependencies among products and plans for a particular user, as well as a prioritization of products.

In one embodiment, even after selecting a particular plan (e.g., an HMO medical plan), a reordering of product priorities may result in a recommendation that the selected plan be reconsidered, at least until a plan from a higher-priority product (e.g., short-term disability) is selected. In this embodiment, it may be preferable for users to delay enrollment in a selected plan until after all products have been considered and desirable plans selected.

In any event, upon completing step 420, the system determines in step 425 whether there remain any more available products that merit consideration (or reconsideration) by the user. If not, the user's benefits portfolio is complete and the process ends (though in the embodiment noted above, the user would enroll in all selected plans before this process concludes, rather than in step 470 below). In other embodiments, users enroll in some, but not all, selected plans in step 470, leaving others for the end.

In any event, upon determining in step 425 that additional products remain to be considered by the user, the education process begins in step 440 regarding the currently highest priority product remaining. For example, for medical products, various vignettes will illustrate the different types of medical coverage available (e.g., PPO v HMO, the effect of premiums, deductibles and out-of-pocket maximums on a similarly situated family over the course of a typical year, etc).

As noted above, this education process is an interactive one in which the user remains in control (e.g., selecting areas of interest and concern, while skipping others), while being guided by a virtual agent who illustrates concepts utilizing other personalized virtual characters, as well as various different forms of media, from text and graphics (e.g., charts) to animations and video. Education step 440 enables users to make informed decisions regarding desired products and plans, and not merely accepting system recommendations without understanding the reasoning underlying those recommendations.

At some point during this education process, the system (in step 450) scores individual plans based on previously identified inter-dependencies (from step 420), and endeavors to resolve those inter-dependencies and fill any gaps to the greatest extent possible. For example, upon identifying a "medical gap" in a selected medical plan, the system might attempt to fill that gap with an Accident product. As a result of testing various scenarios, the system might recommend a particular $10K accident plan to the user, or might recommend a $5K accident plan because the next highest priority product (e.g., a "critical illness" product) will better fill the medical gap when coupled with the $5K accident plan.

As a result of step 450, the system scores and compares available plans within the currently highest priority product (and in some embodiments within other lower priority products as well), and ultimately display recommended plan(s) to the user in step 460. It should be noted that, in one embodiment, the system also communicates the extent to which it is unable to completely resolve all inter-dependencies and fill all identified gaps, as illustrated and discussed in greater detail with respect to FIG. 7 below.

The scoring of products and plans and the formulas and weighting of parameters employed in steps 420 and 450 are discussed in greater detail below with respect to FIGS. 5 and 6. Regardless of how these details are varied, however, it should be emphasized that process 400 continually adopts a "portfolio view" when comparing available products and plans, taking into account the inter-dependencies among available products and plans (including plan details such as coverage levels) and the "gaps" created as a consequence of the user's selection of a particular plan (or various other factors such as age, activity level, health, prior medical history, profession, income level, etc.).

In one embodiment, such information includes claims, actuarial and other third-party data, in addition to employee data from an employer's HRIS system, all of which may have some bearing on the identification in step 420 of inter-dependencies (including medical, income and other gaps in coverage) among available products and plans. It should be noted that even the lack of availability of a particular product or plan can itself be considered a gap or other dependency in a user's benefits portfolio. For example, the lack of availability of an Accident product (e.g., to fill a "medical gap") might result in a different recommendation of a medical plan (e.g., one with less of a medical gap, or none at all).

Such an approach goes well beyond an isolated "plan chooser" approach that compares only the available plans within a given product, and instead adopts a holistic methodology that ultimately yields the most effective portfolio of recommended/selected benefit plans that is personalized to each user.

In step 470, the user selects and (in one embodiment) enrolls in the plan(s) recommended by the system. Note, however, that the user remains in control, and may ignore the system's recommendation and select another plan, or one with slightly different coverages or which varies certain components of a recommended plan. In another embodiment (not shown), users may return to education step 440 to ask additional questions and/or resolve any concerns raised by the system's recommendations.

In one embodiment, enrollment is achieved seamlessly via an integrated third-party enrollment system. The user may or may not even be aware that another third-party system is involved. As noted above, interaction between system 100 and each third-party enrollment system is designed to avoid requesting redundant information from users that has already been made available to system 100. In the event additional information (not already obtained) is required, the third-party enrollment system may request such information from the user or, in another embodiment, communicate such request to system 100, which obtains and transmits the information to the third-party enrollment system.

Once the user has completed step 470, the system records data in step 480 relating to any selected/enrolled plans, and returns to step 420 to reevaluate the various gaps and other inter-dependencies among available products and plans as a result of the user's recent plan selections or changes in any plan selection or plan details. As noted above, users may in some embodiments revisit prior plan selections (and possibly even prior enrollments) at this point.

Eventually, the system determines in step 425 that all available products have been considered in light of any remaining inter-dependencies, and that no further consideration is warranted. In other words, the user's benefits portfolio is complete and process 400 terminates. As will be discussed below with respect to FIG. 7, the user can in one embodiment view a graphical illustration of the user's entire benefits portfolio at any point in this process. Such a visualization might, for example, prompt the user to revisit a particular product, plan or educational section for additional information.

Figure 5:
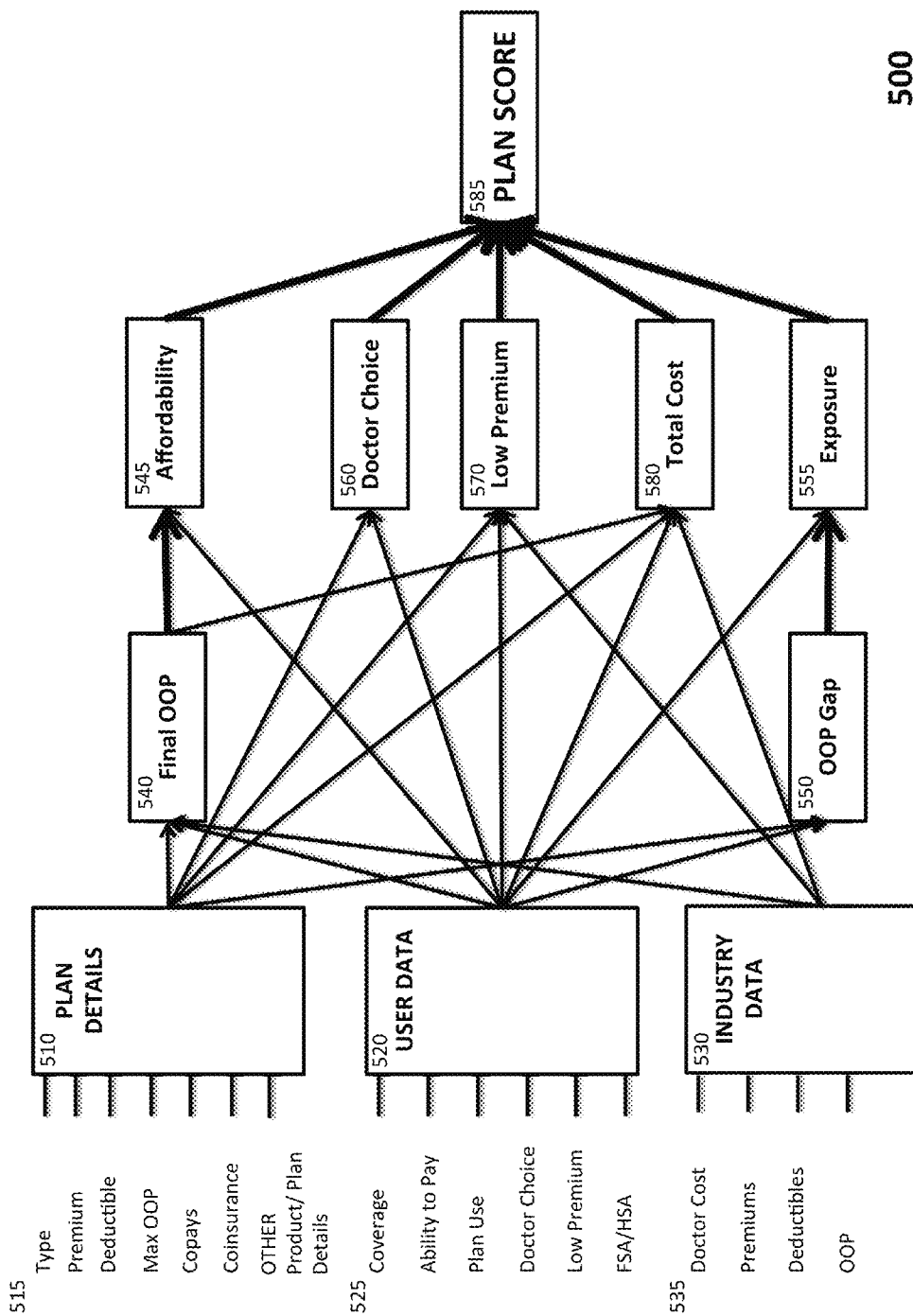
FIG. 5 is a block diagram illustrating one embodiment of an individual plan-level assessment by a decision-support system component of the present invention.

FIG. 5 illustrates one embodiment of an individual plan assessment calculation 500 performed by DSS Engine 240. Note that, while calculation 500 relates to the scoring of an individual plan (to be compared against other available plans), the various factors and weighting of parameters still reflect a "portfolio view" in that the weighting of such parameters, for example, take into account previously identified inter-dependencies (e.g., an income gap) among available products and plans.

For example, a particular medical plan may have a $200 annual premium, which may be categorized as "low" when other available plans and various industry data are taken into consideration. Yet, the weighting of that premium parameter may differ among different users, depending, for example, upon the importance of a low medical plan premium to their overall benefits portfolio. As an example, a relatively wealthy family may value a low medical plan premium with less relative weight than would a struggling family with little or no disposable income. Moreover, the weight of that low medical plan premium may change as that same struggling family makes other benefit plan selections, perhaps leading to the selection of a different medical plan once the overall portfolio analysis is completed.

Thus, the following description of individual plan assessment calculation 500 must be viewed with the understanding that, in this embodiment, the weighting of certain individual plan parameters (and in some cases the parameters themselves, along with their values) has been determined as a result of a portfolio-level analysis of inter-dependencies among available products and plans. Such inter-dependencies therefore may affect the final scoring of an individual plan assessment calculation 500. In one embodiment, the ultimate Plan Score 585 is a weighted sum of various individual parameters, while in other embodiments different and more complex formulas may be employed.

One category of parameters of individual plan assessment calculation 500 includes Plan Details 510. The scoring of an individual plan includes a variety of different plan detail parameters 515 determined by the attributes of the particular plan being scored (regardless of whether the plan is a medical, accident, STD, LTD, Critical Illness, Life Insurance, 401K or other health, financial or related product). Such parameters 515 can include, among others, the type of plan (e.g., PPO v. HMO), the premium, deductible, maximum out-of-pocket expenses, co-pay amounts, and co-insurance percentages, as well as other product and/or plan details (e.g., dependencies from prior plan selections within other products). Different products and alternative individual plans may have different attributes, and thus different plan detail parameters 515.

Another parameter category includes User Data 520, which includes various user parameters 525 relating to the specific user/family for which the individual plan is being scored. Parameters 525 can include, among others, coverage being sought, the user's ability to pay, prior and/or expected plan use, choice of doctor, low premium importance as well as the existence of and/or planned contributions to health savings (HSA) and flexible spending (FSA) accounts.

A final parameter category in this embodiment is Industry Data 530, which includes industry parameters 535, such as average doctor costs, premiums, deductibles and out-of-pocket expenses. In other embodiments, different combinations of parameters are employed, including ranges, medians and other characteristics reflecting industry-wide (including collaborative user data) trends over time.

In one embodiment, these raw parameters (plan detail parameters 515, user data parameters 525 and industry data parameters 535) are weighted by assigning values reflecting their relative importance (including consideration of inter-dependencies, as noted above). For example, plan detail parameter values might include an individual deductible parameter with a value of 1200, a family deductible parameter with a value of 2500, a prescription co-pay value of 35, etc. User data parameter values might include an "ability to pay" parameter value of 2000, an "activity" level of 4 (e.g., reflecting a relatively high activity level on a scale of 1 to 4 based on user input), and a "low premium importance" value of 8 (reflecting a status of "very important" when weighted with an actual premium value—e.g., due in part to a relatively low annual income). Industry data parameter values might include "doctor" values of 60, 160 and 249 (e.g., reflecting percentiles of 25%, 50% and 75%).

From these raw parameter values, DSS Engine 240 generates higher-level or more complex "calculated" parameter values, such as "Final OOP" value 540. In one embodiment, a Final OOP value is calculated by generating a weighted sum of these raw parameter values. For example, if a user's data indicates an expectation of 3 doctor visits (at an average cost of $160) and 2 specialist visits (at an average cost of $250), the Final OOP value would be 980. Actual calculations may of course be more complex, reflecting various other factors affecting out-of-pocket expenses.

Another higher-level calculated parameter value in this embodiment is the "OOP Gap" 550, which reflects an inter-dependency between medical and other products (e.g., Accident plans). In this embodiment, a user's OOP Gap 550 calculation might be as simple as the "ability to pay" (e.g., having a value of 2000) less the out-of-pocket max of the plan (e.g., 4000)—i.e., −2000 in this scenario. Such a "medical gap" would play a role not only in scoring this individual medical plan (to be compared with other alternative available medical plans), but also in determining other recommended products (e.g., Accident plans) should this plan ultimately be selected.

For example, an even higher-level calculated parameter value is Affordability 545, which in this embodiment is a function not only of Final OOP 540, but also of various user data parameters 525, such as the user's "ability to pay." In this scenario, with a Final OOP 540 value of 980, but an ability to pay of 2000, the Affordability 545 value might be relatively high (e.g., 7.4 on a scale of 0 to 10). Note again that these values are assigned so as to reflect appropriate relative weightings of these parameters to the user's personalized situation.

Another higher-level calculated parameter value is Doctor Choice 560, which might receive a value of 10 (on a scale of 1 to 10) if the plan is a PPO and the user explicitly indicated that doctor choice was very important. Similarly, a Low Premium 570 higher-level calculated parameter value might be 7.35, reflecting plan detail parameters 515 (e.g., a premium value of 53), user data parameters 525 (such as an indication that a low premium is very important), as well as industry data parameters 535 (such as an industry max premium of 200). Once again, the precise formula is of relatively little importance, provided that the calculated value reflects the relative importance of these parameters to the user's particular scenario.

Another higher-level calculated parameter value is Total Cost 580, which might receive a value of 7.9 (on a scale of 1 to 10) by combining Final OOP values along with other plan detail parameters 515, tempered by industry data parameters 525, such as average and maximum premium and OOP values. This Total Cost 580 parameter value reflects a cost of this plan relative to that of other available plans based in part upon industry data (i.e., the experience of other similarly situated users).

A final, but very important, higher-level calculated parameter value in this embodiment is Exposure 555, which reflects a level of risk the user takes by selecting the plan—i.e., by creating a "medical gap" represented by OOP Gap value 550, tempered by various user data parameters 525, such as the user's ability to pay, plan use, activity level, etc. For example, an ability to pay roughly equal to OOP Gap value 550 would present a relatively low exposure (all other factors being equal).

The final Plan Score 585 is then calculated—in this embodiment as a weighted sum of the higher-level calculated parameter values. This value is then used to compare alternative plans for a given product (e.g., medical plans) and ultimately present one or more recommended plans to the user.

As noted in FIG. 4 above, once the user selects (in step 470) one or more plans of a given product (whether or not recommended), the system reevaluates (in step 420) the inter-dependencies among the available plans and products and potentially reorders the priority of products to be explored by the user.

Figure 6:
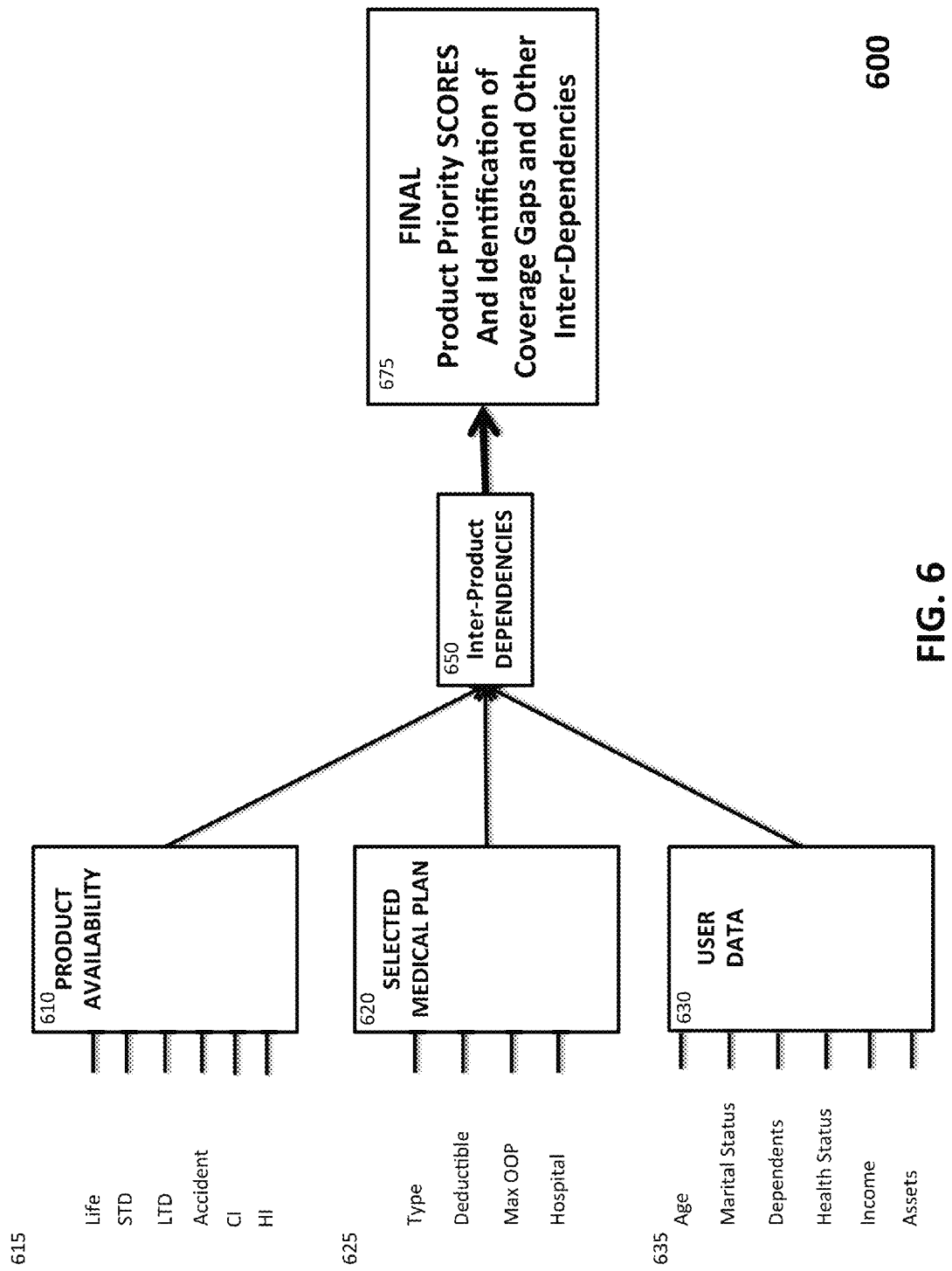
FIG. 6 is a block diagram illustrating one embodiment of a portfolio-level assessment by a decision-support system component of the present invention.

In this regard, as illustrated in FIG. 6, Analysis Layer 325 performs a portfolio-level assessment calculation 600 to generate re-prioritized product scores 676, including identification of available plan and product inter-dependencies (including medical, income and other gaps in coverage), which are used both for educational purposes (in step 440) and in scoring and comparing individual plans (in step 450) in an effort to resolve those inter-dependencies and fill those gaps.

Various categories of parameters are employed in portfolio-level assessment calculation 600, including, in one embodiment, Product Availability parameters 610, in which product parameter values 615 represent products such as Life, STD, LTD, Accident, Critical Illness, Hospital Indemnity (HI) and other available benefit products. In this embodiment, User Data parameters 630 include various user parameter values 635 for parameters such as age, marital status, number of dependents, health status, income, assets, etc. Each of these parameters is assigned a weighted value corresponding to each available product, reflecting the "personalized value" of that product to the user.

For example, consider a scenario in which no medical plan has yet been chosen for a 35-year old single man with multiple dependents. The user's "age parameter" might be assigned a very low "age value" for critical illness products (as such an illness is relatively unlikely based on his age), but a relatively high "age value" for short-term disability products. Similarly, that user's "dependents parameter" might be assigned a relatively high value for life insurance products. When combined together (e.g., via a simple weighted sum), all of these factors may result in a prioritized recommendation for STD and then Life and then Accident products.

These parameters, particularly when taken together, reflect not only the suitability of particular products to each user, but also the inter-dependencies among available products and plans based on attributes of selected products as well as various user and industry data. For example, once our 35-year old single man with multiple dependents selects a medical plan (e.g., one with relatively small exposure), Selected Medical Plan parameters 620 are considered, including, for example, various selected plan parameter values 625, such as type of plan, deductible, maximum out-of-pocket expenses, hospital stay coverage, etc.

At this point, Inter-Product Dependencies 650 are identified and reflected in higher-level calculated parameter values (not shown), such as a "small exposure check" parameter (e.g., given relatively high values for STD and Life due to a "medical gap" in the selected medical plan). Another example of such a higher-level calculated parameter is a "health status" parameter, which is a function of activity level, family history, chronic diseases and other lower-level parameters. A lower "health status" may, for example, increase the likelihood of a higher-priority recommendation of a Critical Illness product. These parameter values reflect inter-dependencies among the various available product and plan attributes, particularly in light of personalized user data as well as collaborative and industry data.

The precise formulas (ranging from simple weighted sums to more complex multi-variable statistical computations) are designed not only to distinguish among available products (e.g., ordering them via their relative scores so that users select higher-priority products first) but also to recommend specific coverage amounts and attributes designed to fill particular identified gaps. As a result, the final Product Priority Scores 675 (including identified gaps and other inter-dependencies for later use in comparing particular plans within a product, as described above with respect to FIG. 5) initially result in prioritized system recommendations (e.g., after selecting a medical plan, consider Accident and then STD products). Once a user explores Accident products, an identified medical gap would result in a particular coverage recommendation (e.g., a $10K accident plan) designed to fill that identified gap. Moreover, a previously identified "income gap" might result in a recommendation for a particular STD coverage amount.

The overall goal of this "portfolio view" (which considers inter-dependencies among products and plans in order to recommend that users explore products in a particular order and select particular coverage amounts) is to minimize the extent to which users ultimately are underinsured or overinsured given the available products and plans and their particular user profiles. As discussed above, collaborative and industry data, including business rules (e.g., weighting life insurance products relatively low for users under the age of 25) also affect this analysis.

Table 1 below illustrates this distinction between a portfolio-level analysis of the present invention and a typical individual-level ("plan chooser") analysis that fails to identify these inter-dependencies and, as a result, fails to avoid overinsuring or underinsuring users.

the most appropriate coverage amounts based on an individual comparison among available plans offered for each product.

In contrast, however, the second column of Table 1 illustrates how a portfolio-level analysis of the present invention yields significantly different results, and avoids (in this example) overinsuring the user. For example, by identifying the "medical gap" between the user's $500 deductible and $1500 out-of-pocket maximum, this analysis avoids the mistake of overcompensating with high accident, critical illness and STD plans. Instead, as a result of system recommendations, accident coverage is declined while a lower-level $5K critical illness plan with a $9.50 monthly premium

TABLE 1

| Benefit PRODUCT | PORTFOLIO-Level Analysis (Healthy-Low Plan Use) | PORTFOLIO-Level Analysis (Less Healthy-High Plan Use) | INDIVIDUAL-Level Analysis (Overinsured) | INDIVIDUAL-Level Analysis (Underinsured) |
|---|---|---|---|---|
| MEDICAL | Plan Type: HDHP-PPO<br>Premium: $53/Mth<br>Deductible: $1200<br>OOP Max: $4000 | Plan Type: PPO<br>Premium: $118/Mth<br>Deductible: $500<br>OOP Max: $1500 | Plan Type: PPO<br>Premium: $118/Mth<br>Deductible: $500<br>OOP Max: $1500 | Plan Type: HDHP-PPO<br>Premium: $53/Mth<br>Deductible: $1200<br>OOP Max: $4000 |
| Accident | Plan Type: Low<br>Premium: $8/Mth<br>Payout: $5K (Low)<br>Additional Benefits:<br>ER and Surgery costs | DECLINED | Plan Type: High<br>Premium: $16/Mth<br>Payout: $10K (High)<br>Additional Benefits:<br>ER and Surgery costs | DECLINED |
| Critical Illness | Plan Type: 5K<br>Premium: $9.50/Mth<br>Payout: $5K (Low) | Plan Type: 5K<br>Premium: $9.50/Mth<br>Payout: $5K (Low) | Plan Type: 15K<br>Premium: $25/Mth<br>Payout: $15K (High) | DECLINED |
| STD | DECLINED | Medium Benefit<br>MIN Waiting Period | Maximum Benefit<br>MIN Waiting Period | Minimum Benefit<br>MAX Waiting Period |
| Life | $300,000 | $250,000 | $500,000 | $200,000 |
| SUMMARY | Chose Low-Benefit MED (OK given Low Plan Use) MED Gap not minimal BUT Low Accident and Low Critical Illness are sufficient to fill MED Gap STD then Declined (as recommended) given that MED Gap already filled Finally, Medium-High Life recommended per General Affordability and Family Situation Result: Appropriately Insured | Chose High-Benefit MED (OK given High Plan Use) MED Gap thus not Large BUT Low Critical Illness and Medium STD justified to Fill Small MED Gap given Health Status Finally, Medium Life recommended per General Affordability and Family Situation Result: Appropriately Insured | Chose High-Benefit MED But then ALSO Selected: High Accident High Critical Illness High STD Max Life MED Gaps insufficient to justify selected amounts for Accident, Critical Illness and STD Life beyond what would be recommended given General Affordability and Family Situation Result: OVERINSURED | Chose Low-Benefit MED But then ALSO: DECLINED Accident DECLINED Critical Illness Chose Minimal STD Chose Minimal Life MED Gaps not sufficiently covered Life coverage is Low given General Affordability and Family Situation Result: UNDERINSURED |

Consider, for example, the 5 benefit products illustrated in the first column of Table 1 (Medical, Accident, Critical Illness, STD and Life). The second and third columns of Table 1 illustrate the distinctions between portfolio-level and individual-level analyses for a user who initially selects a relatively high-benefit medical plan (e.g., a PPO with a $118 monthly premium, a $500 deductible and a $1500 out-of-pocket maximum), which may well be appropriate given the user's expected high plan use (e.g., based on prior medical experience and other user data).

Turning to the third column of Table 1, the user (without the benefit of a portfolio-level analysis) might consider other products in a random order (not shown). The user might, for example, select a $500,000 life insurance plan, a "maximum benefit" STD plan, a high-benefit $15K critical illness plan with a $25 monthly premium, and a high-benefit $10K accident plan (with ER and surgery cost coverage) with a $16 monthly premium. Given the user's financial situation, these relatively low premiums might appear to justify these coverage amounts, and might well be the "best" plans with and a medium-level STD plan are selected. Moreover, a lower $250,000 life insurance plan is recommended (and considered as the lowest priority) given the user's economic situation, which takes into account the user's prior selections of other benefit products. Given the user's health and economic status and identified medical gap, these selections save the user money while still providing sufficient coverage to fill the medical gaps left by the user's medical plan selection.

Similarly, contrasting the first and fourth columns of Table 1, both reflect the initial choice of a lower-benefit medical plan (an HDHP-PPO with a $53 monthly premium, a $1200 deductible and a $4000 out-of-pocket maximum). Turning to the fourth column of Table 1, the user (without the benefit of a portfolio-level analysis) might again consider other products in a random order. In this scenario, the user declines accident and critical illness coverage, selects a minimum-benefit STD plan and $200,000 life insurance policy. As a result, the user is underinsured due to his failure to recognize the medical gap resulting from his selection of the "best available" medical plan.

The portfolio-level analysis illustrated in column 1 of Table 1 reflects the identification of the medical gap (e.g., between the $1200 deductible and $4000 out-of-pocket maximum), and recognizes that this gap is adequately filled with a low $5K accident plan having an $8 monthly premium (still covering ER and surgery costs) coupled with a low $5K critical illness plan with a $9.50 monthly premium. As a result of considering these products in this order, the user can then decline STD coverage and still be adequately insured. Finally, the user can afford a slightly higher $300,000 life insurance plan after taking his economic situation into account, including the prior selections of other benefit products.

Both of these examples illustrate the value of a portfolio-level analysis, which identifies inter-dependencies among available products and plans, and enables users to explore products in the proper priority order and select appropriate coverage amounts to resolve those inter-dependencies and fill medical, income and other gaps. As noted above, the user remains in control, and can follow or reject any system recommendations. Even more importantly, however, the system of the present invention continually educates the user not only with respect to relevant concepts and attributes of available products and plans, but also of the user's "portfolio-level progress" at any point in this process.

Figure 7:
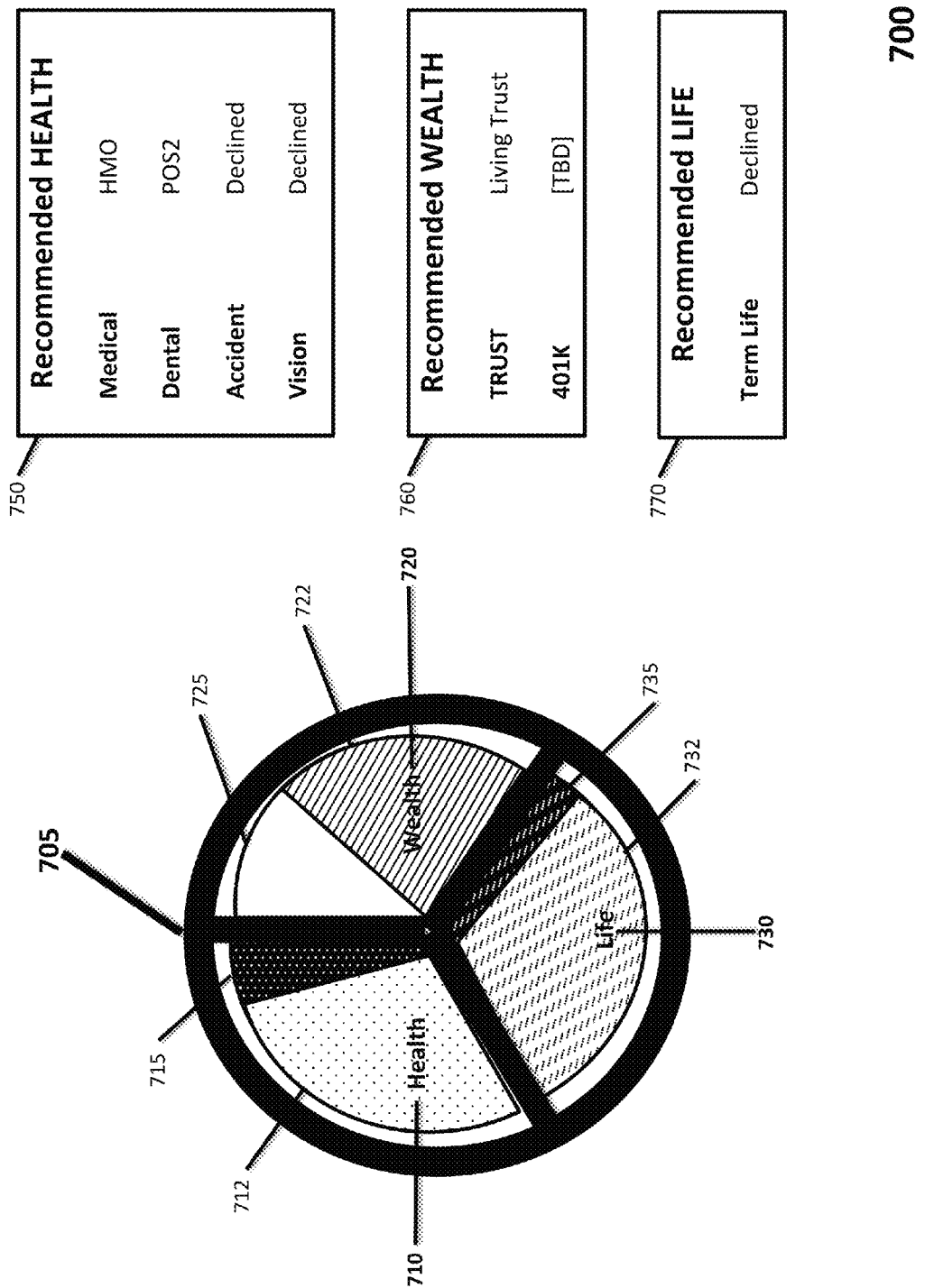
FIG. 7 is a pie chart illustrating one embodiment of a visualization of portfolio-level progress in the context of the present invention.

Chart 700 in FIG. 7 illustrates one embodiment of a visualization provided by the present invention which identifies which products the user has explored, which plans have been selected and the overall extent to which the user's benefits portfolio adequately resolves any identified coverage gaps or other inter-dependencies among available products and plans. It also provides a springboard from which the user can better understand these inter-dependencies and further explore how they can most adequately be resolved.

Chart 700 employs a pie chart 705 to enable users to visualize 3 key aspects of their benefits portfolio—i.e., Health 710, Wealth 720 and Life 730 products. The Health plans table 750 indicates that the user has selected a medical plan (HMO) and a dental plan (POS2), and has declined Accident and Vision coverage. Note that shaded segment 712 (of Health 715 in pie chart 705) is not fully filled in—the gap being represented by dark shaded segment 715. Segment 715 indicates that the user's current portfolio selections have not completely addressed the identified health gaps and other inter-dependencies. Similarly, shaded segment 732 (of Life 730) also reveals a life insurance gap (represented by dark shaded segment 735). Table 770 indicates that the user has declined Term Life coverage.

In one embodiment, clicking on the segments representing these gaps reveals additional information, such as the nature of the gap (e.g., overinsurance v underinsurance) as well as precise identification of particular inter-dependencies among attributes of particular plans and coverage amounts. In certain situations, this additional information may reveal that such gaps are an inevitable result given the limited availability of products and plans being offered, the user's financial limitations and various other factors.

In contrast, blank segment 725 (of Wealth 720) reveals not necessarily a gap, but the current unexplored status of certain wealth products. This status is also reflected in greater detail in table 760, which indicates that the user has selected a living trust (the progress represented by shaded segment 722), but has not yet explored 401K plans. In one embodiment, upon selecting or declining a 401K plan, this gap may or may not disappear (depending upon whether such a plan is appropriate given the user's circumstances).

After having explored all of the relevant products in a given product area, any remaining gaps (such as those reflected by dark shaded segments 715 (Health) and 735 (Life)) can be addressed in various ways. In one embodiment, users may revisit their product and plan selections in an effort to reduce or eliminate such gaps, or at the very least understand the nature of such gaps and specific inter-dependencies among available products and plans.

In any event, chart 700 provides users with a constant personalized progress status regarding their benefits portfolio, including the status of unexplored products and plans as well as coverage gaps resulting from inter-dependencies among available products and plans.

The invention claimed is:

1. A portfolio-driven method, implemented on a server computer, of automatically enrolling end users over a network in selected benefit plans across a plurality of benefit products, the method comprising the following steps:

(a) engaging one or more virtual characters on the server computer in an interactive conversation with an end user of a remote client computer over the network in order to educate the end user regarding the parameters of one or more alternative benefit plans, and collect relevant user data from the end user on an as-needed basis;

(b) recommending to the end user, based upon the relevant data collected from the end user by the one or more virtual characters, one or more alternative benefit plans within each of a plurality of benefit products, wherein the recommendations are determined by scoring and ranking attributes of each benefit plan within a particular benefit product;

(c) identifying one or more inter-dependencies between a benefit plan selected by the end user with respect to a first benefit product and a plurality of alternative benefit plans offered to the end user with respect to a second benefit product, wherein the inter-dependencies are taken into account when recommending to the end user one or more alternative benefit plans with respect to the second benefit product; and (d) automatically enrolling the end user in a selected benefit plan, wherein the automatic enrollment process includes the following additional steps:

(i) receiving, via the one or more virtual characters on the server computer, the end user's request to enroll in a selected one of the recommended alternative benefit plans, (ii) activating a third-party integration API on the server computer, in response to the request, to cause the server computer to establish a connection with a third-party enrollment computer associated with the selected benefit plan; and (iii) transmitting to the third-party enrollment computer over the network the required subset of the relevant user data necessary to complete the enrollment process, wherein the relevant user data was previously collected by the one or more virtual characters on the server computer, thereby avoiding the need for the end user to provide duplicate information to the third-party enrollment computer.

2. The method of claim 1, wherein the third-party integration API is employed, in the event additional information is required to complete the enrollment process, to obtain that additional information over the network from the end user of the remote client computer and to provide that additional information to the third-party enrollment computer over the network via the connection with the third-party enrollment computer.

3. The method of claim 1, further comprising the step of employing a portfolio-level analysis by recommending, based upon the inter-dependencies between the selected benefit plan with respect to the first benefit product and the plurality of alternative benefit plans offered with respect to the second benefit product, that the end user decline coverage with respect to all of the alternative benefit plans offered with respect to the second benefit product.

4. The method of claim 1, further comprising the step of employing a portfolio-level analysis by recommending, after taking into account the inter-dependencies between the selected benefit plan with respect to the first benefit product and the plurality of alternative benefit plans offered with respect to the second benefit product, that the end user select a lower-level or higher-level benefit plan offered with respect to the second benefit product than would be recommended had an individual-level analysis been employed which did not take the inter-dependencies into account.

5. The method of claim 1, wherein the first benefit product is a medical product and the second benefit product is an accident product, critical illness product, short-term or long-term disability product or a life insurance product.

6. A portfolio-driven decision support system, implemented on a server computer, that automatically enrolls end users over a network in selected benefit plans across a plurality of benefit products, the system comprising:
 (a) one or more virtual characters on the server computer that engage in an interactive conversation with an end user of a remote client computer over the network in order to educate the end user regarding the parameters of one or more alternative benefit plans, and collect relevant user data from the end user on an as-needed basis;
 (b) a decision support engine on the server computer that recommends to the end user, based upon the relevant data collected from the end user by the one or more virtual characters, one or more alternative benefit plans within each of a plurality of benefit products, wherein the decision support engine utilizes personalized user data and details of each alternative benefit plan to score and rank attributes of the alternative benefit plans, and recommends one or more of the highest ranked benefit plans to the end user;
 (c) a portfolio analysis module on the server computer that identifies one or more inter-dependencies between a benefit plan selected by the end user with respect to a first benefit product and a plurality of alternative benefit plans offered to the end user with respect to a second benefit product, wherein the portfolio analysis module causes the decision support engine to utilize the inter-dependencies to score and rank attributes of the alternative benefit plans; and
 (d) a back-end enrollment component on the server computer that automatically enrolls the end user in a selected benefit plan by:
  (i) receiving, via the one or more virtual characters on the server computer, the end user's request to enroll in a selected one of the recommended alternative benefit plans,
  (ii) activating a third-party integration API on the server computer, in response to the request, to cause the server computer to establish a connection with a third-party enrollment computer associated with the selected benefit plan; and
  (iii) transmitting to the third-party enrollment computer over the network the required subset of the relevant user data necessary to complete the enrollment process, wherein the relevant user data was previously collected by the one or more virtual characters on the server computer, thereby avoiding the need for the end user to provide duplicate information to the third-party enrollment computer.

7. The system of claim 6, wherein the third-party integration API is employed, in the event additional information is required to complete the enrollment process, to obtain that additional information over the network from the end user of the remote client computer and to provide that additional information to the third-party enrollment computer over the network via the connection with the third-party enrollment computer.

8. The system of claim 6, wherein the portfolio analysis module employs a portfolio-level analysis to recommend, based upon the inter-dependencies between the selected benefit plan with respect to the first benefit product and the plurality of alternative benefit plans offered with respect to the second benefit product, that the end user decline coverage with respect to all of the alternative benefit plans offered with respect to the second benefit product.

9. The system of claim 6, wherein the portfolio analysis module employs a portfolio-level analysis to recommend, after taking into account the inter-dependencies between the selected benefit plan with respect to the first benefit product and the plurality of alternative benefit plans offered with respect to the second benefit product, that the end user select a lower-level or higher-level benefit plan offered with respect to the second benefit product than it would recommend had it employed an individual-level analysis which did not take the inter-dependencies into account.

10. The system of claim 6, wherein the first benefit product is a medical product and the second benefit product is an accident product, critical illness product, short-term or long-term disability product or a life insurance product.

\* \* \* \* \*